(12) United States Patent
Schmit et al.

(10) Patent No.: US 9,827,633 B2
(45) Date of Patent: Nov. 28, 2017

(54) METHOD FOR THE PREPARATION OF ALUMINIZED STEEL SHEETS TO BE WELDED AND THEN PRESS HARDENED

(71) Applicant: ArcelorMittal, Luxembourg (LU)

(72) Inventors: Francis Schmit, Clermont (FR); Rene Vierstraete, Maisons-Laffitte (FR); Qingdong Yin, Montataire (FR); Wolfram Ehling, Ghent (BE)

(73) Assignee: ArcelorMittal, Luxembourg (LU)

( * ) Notice: Subject to any disclaimer, the term of this patent is extended or adjusted under 35 U.S.C. 154(b) by 0 days.

(21) Appl. No.: 15/615,226

(22) Filed: Jun. 6, 2017

(65) Prior Publication Data
US 2017/0266761 A1 Sep. 21, 2017

Related U.S. Application Data

(63) Continuation of application No. 15/306,735, filed as application No. PCT/IB2015/000508 on Apr. 17, 2015.

(30) Foreign Application Priority Data

Apr. 25, 2014 (WO) .................. PCT/IB2014/000612

(51) Int. Cl.
*B23K 26/60* (2014.01)
*B23K 26/26* (2014.01)
(Continued)

(52) U.S. Cl.
CPC .............. *B23K 26/60* (2015.10); *B23K 26/26* (2013.01); *B23K 26/32* (2013.01); *B23K 26/322* (2013.01);
(Continued)

(58) Field of Classification Search
CPC ...... B23K 26/26; B23K 26/322; B23K 26/60; B23K 2201/006; C21D 9/50
(Continued)

(56) References Cited

U.S. PATENT DOCUMENTS 6,296,805 B1    10/2001  Laurent et al.
9,375,809 B2 *   6/2016  Canourgues ............. B23K 9/23
(Continued)

FOREIGN PATENT DOCUMENTS

EP      0971044 A1    1/2000
EP      2007545 B1    7/2009
(Continued)

*Primary Examiner* — Samuel M Heinrich
(74) *Attorney, Agent, or Firm* — Davidson, Davidson & Kappel, LLC (57) ABSTRACT

A method for the preparation of steel sheets for fabricating a welded steel blank is provided. The method includes procuring at least two pre-coated steel sheets, each having a pre-coating of an intermetallic alloy layer, topped by a layer of aluminum metal or aluminum alloy or aluminum-based alloy. The sheets have a principal face, an opposite principal face, and at least one secondary face. The sheets are positioned so a gap between 0.02 and 2 mm exists between the secondary faces. The secondary faces face each other. The positioning of the first and second sheets defines a median plane perpendicular to the principal faces. Layers of metal alloy are removed by melting and vaporization simultaneously on the principal faces, in a peripheral zone of the sheets, the peripheral zones being the zones of the principal faces closest in relation to the median plane.

28 Claims, 5 Drawing Sheets

(51) Int. Cl.
*B23K 26/32* (2014.01)
*B23K 26/322* (2014.01)
*B23K 103/08* (2006.01)
*B23K 101/18* (2006.01)
*B23K 101/34* (2006.01)
*B23K 103/04* (2006.01)
*B23K 103/00* (2006.01)
*B23K 101/00* (2006.01)

(52) U.S. Cl.
CPC .... *B23K 2201/006* (2013.01); *B23K 2201/18* (2013.01); *B23K 2201/34* (2013.01); *B23K 2203/04* (2013.01); *B23K 2203/08* (2013.01); *B23K 2203/50* (2015.10)

(58) Field of Classification Search
USPC ........ 403/271; 428/544, 577, 681, 684, 687; 219/121.64; 148/525, 534
See application file for complete search history.

(56) References Cited

U.S. PATENT DOCUMENTS

| | | |
|---|---|---|
| 9,623,515 B2 * | 4/2017 | Breuer .................. B23K 26/26 |
| 2014/0003860 A1 | 1/2014 | Evangelista et al. |
| 2015/0030382 A1 | 1/2015 | Cretteur et al. |

FOREIGN PATENT DOCUMENTS

| | | |
|---|---|---|
| JP | H06246475 A | 9/1994 |
| JP | 2004223543 A | 8/2004 |
| JP | 2005169444 A | 6/2005 |
| WO | 2013014512 A1 | 1/2013 |

* cited by examiner

METHOD FOR THE PREPARATION OF ALUMINIZED STEEL SHEETS TO BE WELDED AND THEN PRESS HARDENED

This is a continuation of U.S. patent application Ser. No. 15/306,735, filed Oct. 25, 2016 which is a National Stage of International Application PCT/IB2015/000508, filed Apr. 17, 2015 which claims priority to International Application PCT/IB2014/000612, filed Apr. 25, 2014, the disclosures of which are hereby incorporated by reference herein.

The invention relates to a method for the preparation of aluminized steel sheets intended to be welded.

The invention further relates to a method for the fabrication of welded blanks from the aluminized steel sheets described above.

The invention further relates to a method for the fabrication of press-hardened parts from the above welded blanks, to be used as structural or safety parts in automotive vehicles.

BACKGROUND

It is known that welded steel parts can be fabricated from steel blanks that have different compositions and/or thicknesses, which are continuously butt-welded. In one known method of fabrication, these welded blanks are cold worked, for example by cold stamping. According to a second known fabrication method, these welded blanks are heated to a temperature that makes possible the austenitization of the steel followed by hot forming and rapid cooling in a forming die. The invention relates to this second mode of fabrication.

The composition of the steel is selected to make it possible to carry out the heating and hot forming steps and to confer a high mechanical strength, high impact strength as well as good resistance to corrosion to the final welded part. Thanks to their ability to absorb impacts, steel parts of this type have applications in particular in the automobile industry and more particularly for the fabrication of anti-intrusion parts, structural parts or parts that contribute to the safety of automotive vehicles.

Among the steels that exhibit the characteristics required for the applications mentioned above, coated steel sheet as described in publication EP 971044 includes in particular a pre-coating of an aluminum alloy or an aluminum-based alloy. The sheet is coated, for example by hot dip coating, in a bath having silicon and iron in controlled quantities, in addition to aluminum. After the hot forming and cooling, it is possible to obtain a mainly martensite microstructure, and the mechanical tensile strength can exceed 1500 MPa.

A known method for the fabrication of welded steel parts includes procuring at least two steel sheets as described in publication EP971044 to be butt welded to obtain a welded blank, optionally to cut this welded blank, then to heat the welded blank before carrying out a hot forming operation, for example by hot stamping, to confer on the steel part the form required for its application.

One known welding technique is laser beam welding. This technique has advantages in terms of flexibility, quality and productivity compared to other welding techniques such as seam welding or arc welding. However, in the assembly methods that include a melting step, the aluminum-based pre-coating made up of a layer of intermetallic alloy in contact with the steel substrate, topped by a metal alloy layer, is diluted during the welding operation with the steel substrate within the molten zone, which is the zone that is liquefied during the welding operation and solidifies after this welding operation, forming the bond between the two sheets.

Two phenomena can then occur:
- the first phenomenon is that an increase in the aluminum content in the molten metal resulting from the dilution of a portion of the pre-coating in this zone leads to the formation of intermetallic compounds. These compounds can be sites for the initiation of cracks when mechanical stress is applied.
- the second phenomenon is that aluminum, which is an alphagenic element in solid solution in the molten zone, retards the transformation into austenite in this zone during the heating step preceding the hot stamping. It is therefore no longer possible to obtain a fully tempered structure in the molten zone after the cooling that follows the hot forming, and the welded joint includes ferrite. The molten zone then has a hardness and a mechanical tensile strength less than that of the two adjacent sheets.

To prevent the first phenomenon described above, publication EP 2007545 describes a method that includes removing the superficial layer of metal alloy on the periphery of the sheets to be subjected to the welding operation, leaving the intermetallic alloy layer. This removal can be carried out by brushing, machining or by the application of a laser beam. In the latter case, the width of the removal zone is defined thanks to the longitudinal movement of a laser beam of a certain width, or even by the oscillation of a laser beam smaller than this width, using the edge of the sheet as a reference point. The intermetallic alloy layer is retained to guarantee satisfactory corrosion resistance and to prevent the phenomena of decarburization and oxidation during the heat treatment that precedes the forming operation.

To prevent the second phenomenon mentioned above, publication WO2013014512 describes a method that includes, in addition to removing the metal layer described above, the elimination of the aluminum present on the cut edge of the sheets before welding, the presence of which, can result from a cutting operation, and to create a welded joint with a filler metal wire to increase the carbon content of the melted zone in specific proportions.

BRIEF SUMMARY

In the methods described in the above referenced publications, when the removal of the layer of metal alloy is the result of a phenomenon including a melting, such as a removal by laser beam, there is a more or less significant amount of aluminum that has run over the cut edge (which is also called the secondary face) of the sheet. A subsequent welding leads to incorporation of this aluminum by dilution in the molten zone and results in welded joints, the mechanical strength and/or toughness of which are less than those of the base metal.

The different methods for removing the aluminum that has flowed over the cut edge by machining, scraping or ablation by pulsed laser are tricky to carry out due to the difficulty of positioning the blank in relation to the die or to the beam, the rapid wear of the tools when the removal is carried out by mechanical means, or the potential splashing of aluminum on the prepared faces in the case of a laser ablation on the cut edge.

In addition, after the removal of the layer of aluminum metal on the periphery of the sheets, the underlying material has a duller and darker appearance. It is known that laser welding requires a very accurate positioning of the beam in relation to the plane of the joint formed by the sheets to be assembled. This positioning and guidance of the beam, or "seam tracking", is conventionally controlled by sensors that are capable of detecting the variation, in a direction at a right angle to the welded joint, of a reflected light beam, whereby the joint plane appears significantly darker. However, the side-to-side placement before welding of the two plates from which the metallic layer has been removed from the periphery results in only a small variation in contrast at the level of the mating plane, which is difficult to detect, and the guidance of the laser beam is then controlled with significantly less accuracy.

It is therefore desirable to develop a method for the preparation of the peripheral zones of sheets pre-coated with aluminum that does not have the disadvantages described above.

It is desirable to have an economical preparation method that makes it possible to eliminate the expensive, time-consuming and complex operation of cleaning the aluminum or the aluminum alloy that has run over the secondary face following removal by melting and vaporization.

It is also desirable to have a preparation method that guarantees an aluminum content less than 0.3% in the welded joint fabricated from sheets pre-coated with aluminum or aluminum alloy.

It is also desirable to have a method that improves the accuracy of seam tracking during the welding of sheets pre-coated with aluminum or aluminum alloy, the metal layer of which has been removed over the periphery.

An object of the present invention is to resolve the problems described above.

An object of the invention provides a method for the preparation of sheets for the fabrication of a welded steel blank including the following steps in succession:

procurement of at least one pre-coated first steel sheet 11 and one pre-coated second steel sheet 12, made up of a steel substrate 25, 26 and a pre-coating 15, 16 made up of an intermetallic alloy layer 17, 18 in contact with the steel substrate, topped by a layer of aluminum metal or aluminum alloy or aluminum-based alloy 19, 20, the first sheet 11 including a principal face 111, an opposite principal face 112, and at least one secondary face 71, the second sheet 12 including a principal face 121, an opposite principal face 122 and at least one secondary face 72, then the first 11 and second 12 sheets are positioned, leaving a gap 31 of between 0.02 and 2 mm between the secondary faces 71 and 72 facing each other, the positioning of the first 11 and second 12 sheets defining a median plane 51 perpendicular to the principal faces of the first sheet 11 and the second sheet 12, then by melting and vaporization simultaneously on the principal faces 111 and 121, the layer of metal alloy 19 is removed in a peripheral zone 61 of the sheet 11, and the layer of metal alloy 20 in a peripheral zone 62 of the sheet 12, the peripheral zones 61 and 62 being the zones of the principal faces 111 and 121 closest in relation to the median plane 51 located one on either side of it.

Preferably, the simultaneous removal by melting and vaporization is carried out by a laser beam that spans this median plane 51.

The width of the peripheral zone 61 and the width of the peripheral zone 62 are preferably between 0.25 and 2.5 mm.

In one particular mode, the width of the peripheral zone 61 and the width of the peripheral zone 62 are equal.

In another mode, the width of the peripheral zone 61 and the width of the peripheral zone 62 are different.

Preferably, the removal by melting and vaporization occurs simultaneously on the principal faces 111, 121 and 112, 122.

In one particular mode, the metal alloy layers 19, 20 are removed from the peripheral zones 61, 62 of each of the first 11 and second 12 steel sheets, leaving their respective intermetallic alloy layers 17, 18 in place.

In one mode of the invention, the substrates 25, 26 have different steel compositions.

In one particular mode, the pre-coatings 15, 16 have different thicknesses.

Advantageously, the metal alloy layer 19, 20 of the pre-coating 15, 16 includes, with concentrations expressed by weight, between 8 and 11% A silicon, between 2 and 4% iron, the balance of the composition being aluminum and unavoidable impurities.

The gap 31 between the secondary faces 71 and 72 is advantageously greater than 0.04 mm and very advantageously greater than 0.06 mm.

An additional object of the invention provides a method for the fabrication of a welded blank characterized in that at least a first 11 and a second 12 sheet prepared by a method according to any of the Claims 1 through 10 is procured, and in that a welding operation of the first sheet 11 and second sheet 12 is carried out in the removal zone by melting and vaporization, along a plane defined by the above-mentioned median plane 51, less than one minute after the operation of removal by melting and vaporization on the first sheet 11 and the second sheet 12.

Preferably, the welding operation is carried out by at least one laser beam 95.

Preferably, the welding operation is carried out simultaneously by two laser beams, one of which carries out a welding of the side of the principal faces 111 and 121, the other of which carries out a welding of the side of the opposite principal faces 112 and 122.

The removal by melting and vaporization is advantageously carried out by a laser beam 80, and the devices that make it possible to carry out the removal and welding operation are combined in a single piece of equipment, the relative speed of displacement of which in relation to the first sheet 11 and the second sheet 12 is identical.

Preferably, the welding operation is carried out by simultaneously using at least one laser beam 95 and a filler rod 82.

In one particular mode, the removal step is guided by a device that tracks the median plane 51, the coordinates (x-y) defining the location of the plane 51 at an instant t, are recorded by computerized means, and are used to guide the welding operation that will subsequently take place.

In one mode of the invention, the removal step is guided by a first device that tracks the median plane 51, and the welding is guided by a second device that tracks the median plane and is separate from the first device.

In an additional mode of the invention, the sheets 11 and 12 are clamped by a clamping device 98 during the removal operation by melting and vaporization, the clamping being kept constant by the device 98 until the welding operation and at least during the welding operation.

An additional object of the invention is a method for the fabrication of a press-hardened piece from a welded blank including the following steps in succession:

at least one welded blank fabricated according to any of the methods described above is procured, then the welded blank is heated to form, by alloying between the steel substrate 25, 26 and the pre-coating 15, 16, an intermetallic alloy compound, in a manner that confers a partly or totally austenitic structure on the substrate 25, 26, then the welded blank is hot formed to obtain a part, then the part is cooled at a rate sufficient to at least partly form martensite or bainite in the substrate 25, 26, thereby achieving a press hardening.

Preferably, the hot forming of the welded blank is carried out by a hot stamping operation.

An additional object of the invention is a welded blank constructed by assembling at least one first 11 and one second 12 pre-coated steel sheet, made up of a steel substrate 25, 26 and a pre-coating 15, 16 made up of an intermetallic alloy layer 17, 18 in contact with the steel substrate, topped by a layer of aluminum metal, aluminum alloy or aluminum-based alloy 19, 20, the first sheet 11 having a principal face 111 and an opposite principal face 112, the second sheet 12 having a principal face 121 and an opposite principal face 122, the metallic alloy layer 19 being removed by melting and vaporization in a peripheral zone 61 of the sheet 11 and the layer of metal alloy 20 in a peripheral zone 62 from the sheet 12, the welded blank having at least one welded joint 52 that defines a median plane 51 perpendicular to the principal faces of the first sheet 11 and the second sheet 12, and cross sections 52a, 52b . . . 52n perpendicular to the median plane 51, characterized in that the morphological characteristics of the layers 17 and 18 resulting from solidification after melting and vaporization of the pre-coating in the peripheral zones 61 and 62 are identical in the sections 52a, 52b, . . . 52n on either side of the median plane 51.

The sum of the widths of the peripheral zones 61 and 62 preferably varies by less than 10% along the welded joint.

Preferably, the layer of metal alloy 19, 20 of the pre-coating 15, 16 includes, with concentrations expressed by weight, between 8 and 11% silicon and between 2 and 4% iron, the balance of the composition made up of aluminum and unavoidable impurities.

An additional object of the invention is a device for the fabrication of welded blanks including:

a device 91 that delivers at least one first 11 and one second 12 steel sheets pre-coated with aluminum, aluminum alloy or an aluminum-based alloy, a positioning device 92 for the sheets, to obtain a median plane 51 between the sheets 11 and 12, a clamping device 98 for the sheets, at least one source that makes it possible to generate a laser beam 80 to remove the layer of aluminum metal, aluminum alloy or aluminum-based alloy by melting and vaporization simultaneously in a peripheral zone 61, 62 of the first 11 and second 12 sheets, at least one guidance device 94 that makes it possible to position the laser beam 80 in relation to the median plane 51, at least one source that makes it possible to generate a laser beam 95 for the welding of the sheets 11 and 12, in the zone from which the aluminum metal layer 61, 62 has been removed, to obtain a welded joint, at least one device that makes it possible to obtain a relative displacement of the sheets 11 and 12 in relation to the laser beams 80 and 95, the laser beams 80 and 95 being located on a single line with reference to the median plane 51 and at a fixed distance 64 from each other.

Preferably, the distance 64 between the laser beams 80 and 95 is between 0.5 mm and 2 m. The distance 64 is advantageously less than 600 mm. In one particular mode, the distance 64 is less than 5 mm.

In one advantageous mode, the laser beam 80 is emitted from an ablation head and the beam 95 is emitted from a welding head, the heads forming a compact element with a common focusing device for the laser beams 80 and 95.

Advantageously, the guidance device 94 also makes it possible to position the laser beam 95 with reference to the median plane 51.

In one particular mode, the device further includes a filler rod device 82 for the construction of the above-mentioned welded joint.

The device advantageously further includes a laser beam that makes it possible to carry out welding on the face opposite to the face where the beam 95 operates.

An additional object of the invention is the use of a press-hardened part according to the characteristics described above for the fabrication of structural parts, anti-intrusion or impact absorption parts in vehicles, in particular automobiles.

BRIEF DESCRIPTION OF THE DRAWINGS

Other characteristics and advantages of the invention will become apparent from the following description, which is presented by way of example and refers to the accompanying figures listed below, in which.

DETAILED DESCRIPTION

It will be noted that the diagrams do not attempt to reproduce the relative dimensions of the different elements among one another, but are intended merely to facilitate the description of the different constituent parts of the invention.

Figure 1:
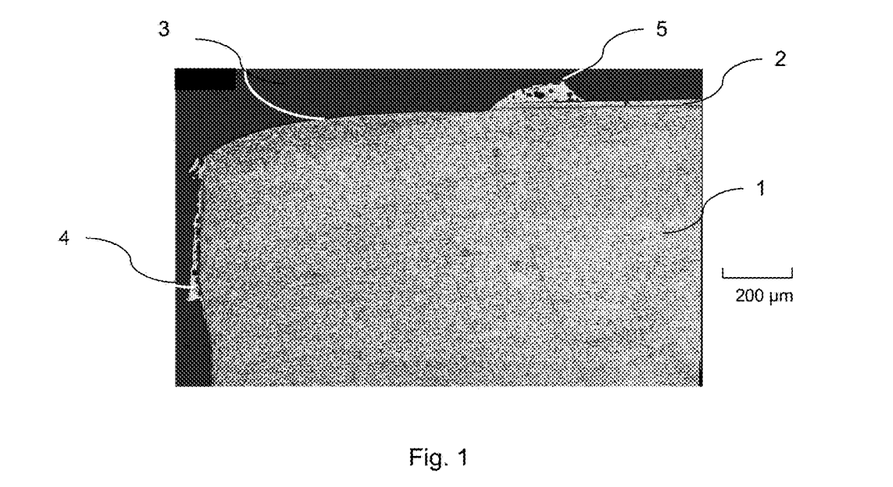
FIG. 1 shows a micrographic section of a sheet precoated with aluminum to be welded, the periphery of which has been prepared according to a method of the prior art.

In the methods of the prior art, where the removal of the metallic alloy layer is the result of melting, more or less significant quantities of aluminum that flow over the secondary face are present. This situation is illustrated in FIG. 1, which shows a macrographic section of a steel sheet 1 mm thick pre-coated with an aluminum alloy from which the surface metal alloy layer has been removed by melting and vaporization using a laser beam. FIG. 1 also illustrates a steel substrate 1 having an aluminum pre-coating 2 to 25 μm thick. Only one of the two principal faces of the sheet is illustrated in the macrograph. On the periphery of one principal face of the sheet, a pulsed laser beam has been used to remove the metallic aluminum layer, leaving the inter-metallic layer in place, thereby creating an ablation zone 3. On account of the vapor pressure or plasma generated by the laser beam, the liquid aluminum is expelled to the periphery of the zone 3, thereby creating an aluminum accumulation zone 5. This ablation operation has also created a flow 4 of a portion of the aluminum layer over the secondary face, the length of which can reach approximately 0.4 mm. Contrary to what happens in the case of the impact of the laser beam on an organic coating which is completely vaporized, the impact of the laser beam on a metallic coating does not result in its total disappearance by vaporization, but in a partial vaporization and melting.

Figure 2:
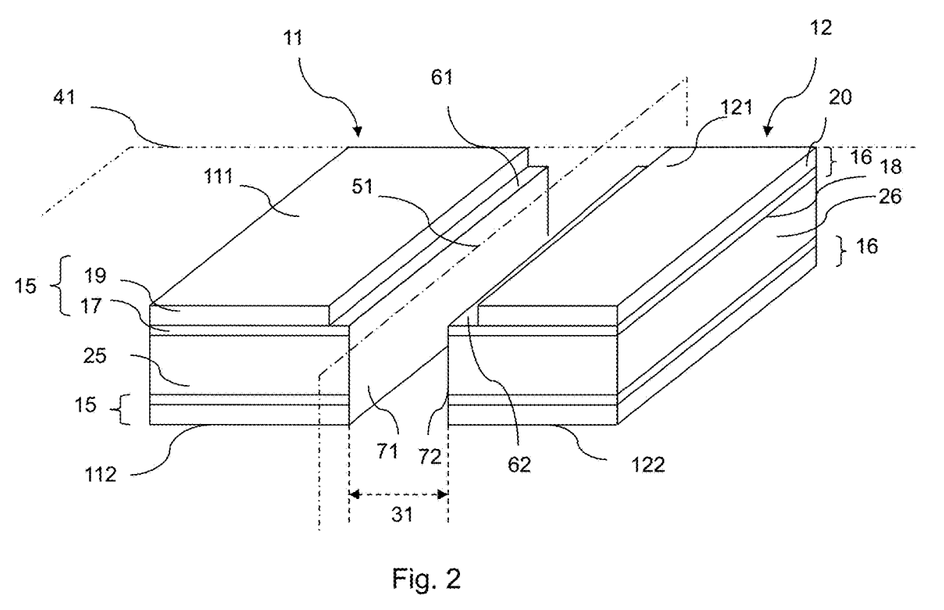
FIG. 2 is a schematic diagram illustrating two metal sheets placed end to end, after a treatment according to the invention for the simultaneous removal of the metallic layer from the periphery.

The inventors have shown that this phenomenon of flow along the secondary face can be prevented by the following method. As illustrated in FIG. 2, at least two sheets 11 and 12 of pre-coated steel are procured, which can be of the same thickness or different thicknesses. FIG. 2 illustrates the first alternative. At this stage, the sheets 11 and 12 are not necessarily rectangular, and the geometry of their contour is related to the geometry of the final parts that are to be fabricated, which will be achieved by a subsequent forming operation. The term "sheet" here is used in a broad sense to mean any object obtained by cutting from a strip, coil or sheet.

These sheets are made up of a steel substrate 25 and 26, which can be in particular in the form of a hot-rolled sheet or cold-rolled sheet, depending on the desired thickness. The composition of the substrates can be identical or different, depending on the desired distribution of the mechanical characteristics over the final part. These steels are heat-treatable steels, which are capable of undergoing a martensitic or bainitic quenching after an austenitization treatment. The thickness of the sheets is preferably between approximately 0.5 and 4 mm, the thickness range used in particular in the fabrication of structural or reinforcement parts for the automobile industry.

The sheets 11 and 12 respectively include principal faces 111, 112 and 121, 122. On the surface of each of these faces, there is a pre-coating 15 and 16, the thickness and composition of which can be identical or different in the sheets 1 and 2. These pre-coatings 15 and 16 are both obtained by dipping in an aluminizing bath.

The pre-coating 15 is itself composed:

of a layer of inter-metallic alloy 17 in contact with the substrate 25. This is an alloy layer of the type $Fe_xAl_y$, formed by reaction between the substrate 25 and the molten metal of the aluminizing bath during the continuous passage of the sheets through the aluminizing bath. This layer typically has a thickness of 3 to 10 μm. The aluminizing bath is a bath of aluminum or aluminum alloy in which aluminum is present in a percentage by weight greater than 50%, or an aluminum-based alloy. In this latter case, the aluminum is the main component of the alloy.

of a metallic alloy layer 19, the composition of which is practically the same as that of the bath of aluminum, aluminum alloy or aluminum-based alloy.

Likewise, in the sheet 12, the pre-coating 16 is constituted by an intermetallic alloy layer in contact with the substrate 26 and a surface metallic layer.

Preferably, the metallic alloy 19, 20 of the pre-coating can contain from 8 to 11 by weight silicon and from 2 to 4% iron, the balance of the composition made up of aluminum and unavoidable impurities. The addition of silicon makes it possible in particular to reduce the thickness of the inter-metallic layer 17.

The two sheets 11 and 12 can be positioned so that their principal faces 111 and 112 are in the same plane 41. In this manner, a laser beam placed simultaneously over these two sheets will interact with them identically. However, the two sheets 11 and 12 can also be positioned not exactly in the same plane, i.e. the focal point of the laser beam is not positioned exactly on the same level in relation to the surface of the two sheets with an identical pre-coating. This situation can be encountered, for example, in the case of a difference of thickness between the two sheets 11 and 12. Even in this case, the inventors have verified that the desired results, in particular the absence of a flow of the pre-coating along the secondary faces, are obtained when the method is according to the invention is used.

The two sheets 11 and 12 are positioned to place with their secondary faces 71 and 72 end to end. This positioning therefore defines a median plane 51 between the sheets 11 and 12, perpendicular to their principal faces, and a gap 31 between the sheets.

According to the invention, the respective metallic alloy layers 19 and 29 are then removed simultaneously, by a method including a melting and a vaporization, over a peripheral portion 61 of the sheet 11 and a peripheral portion 62 of the sheet 12. As a general rule, the majority of this removal is due to a melting phenomenon. This rules out methods where the layers 19 and 20 are removed purely by vaporization. This removal, which is also called an ablation, is preferably carried out by a pulsed laser beam. The impact of the high power and high energy density laser on the pre-coating causes a liquefaction and vaporization of the surface of the latter. On account of the plasma pressure, the liquefied pre-coating is expelled toward the periphery of the zone where the ablation is taking place. A succession of short laser pulses with appropriate parameters results in an ablation of the metallic layer 19 and 20, leaving the inter-metallic alloy layer 17 and 18 in place. However, depending on the degree of corrosion resistance desired on the finished part, it is also possible to remove a more or less large portion of the intermetallic layer 17 and 18, for example more than 50% of this layer. The interaction of a pulsed laser beam directed toward the periphery 61 and 62 of pre-coated sheets, in relative translation with reference to these sheets, therefore results in a removal of the metallic layer 19 and 20.

The ablation is carried out simultaneously on the sheets 11 and 12, i.e. the means of melting and vaporization are applied simultaneously to the peripheral zones 61 and 62 facing each other. In particular, when the ablation is carried out using a laser beam, the laser beam impacts zones 61 and 62, spanning the median plane 51. In one preferred mode, a pulsed laser beam with a rectangular shape is used. A smaller laser beam can also be used, which is made to oscillate so that it covers the width to be processed. The method can also be carried out using a principal beam divided into two rectangular sub-beams, each spanning the median plane 51. These two sub-beams can be positioned symmetrically with reference to the plane 51, or can be longitudinally offset in relation to each other in the direction of welding. These two sub-beams can be of identical or different sizes.

In these different simultaneous ablation modes, it would then be expected that the aluminum resulting from the melting due to the impact of the laser beam would flow over the secondary phases 71 and 72 under the influence of gravity and the plasma pressure generated by the beam.

Surprisingly, the inventors have shown that the secondary faces 71 and 72 do not experience a flow of aluminum when the gap 31 is between 0.02 and 2 mm. Without being bound by a theory, it is thought that the secondary faces 71 and 72 are covered by a very thin layer of iron and/or aluminum oxide originating from the cutting of the sheets 11 and 12. Taking into consideration the interfacial tension between this thin layer of oxides and liquid aluminum on one hand and the specific gap 31 on the other, the surface free of liquid aluminum between the sheets 11 and 12 bends to form a wetting angle, without the liquid flowing into the space 31. A minimal gap of 0.02 mm makes it possible for the beam to pass between the sheets 11 and 12, removing potential traces of aluminum that may have been on the secondary face. Moreover, as will be explained below, in one variant of the method, the welding is carried out immediately after this ablation operation. When the distance 31 is less than 0.02 mm, there is a possibility that the two facing parts of the sheets 11 and 12, on account of their thermal expansion due to the ablation and welding operations, will not come in contact with each other, resulting in an undesirable plastic deformation.

The gap 31 is advantageously greater than 0.04 mm, which makes it possible to use mechanical cutting methods, the tolerance of which does not have to be controlled with extreme precision, which in turn makes it possible to reduce the costs of production.

In addition, as explained above, the guidance of the welding laser beam is more difficult in the case of sheets from which the coating has been removed on the periphery on account of their darker appearance. The inventors have shown that a width of the gap 31 greater than 0.06 mm makes it possible to increase significantly the optical contrast of the joint plane, which appears differentiated in relation to the peripheral ablation zones, and therefore ensures that the weld is properly positioned with respect to the median plane 51.

Figure 3:
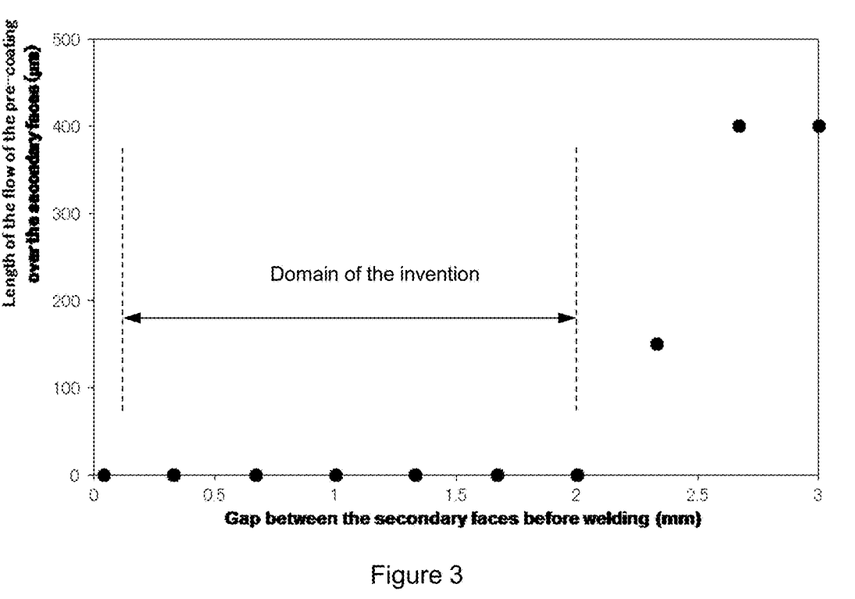
FIG. 3 illustrates the influence of the positioning gap between two sheets placed end to end, the metal pre-coating layer of which has been removed by simultaneous peripheral ablation, on the flow of the pre-coating along the secondary faces of these sheets.

In addition, the inventors have found that when the gap 31 is greater than 2 mm, the mechanism explained above is no longer operative to prevent the flow of liquid aluminum, as the experimental results illustrated in FIG. 3 demonstrate.

The gap can advantageously be between 0.02 and 0.2 mm.

For the ablation process, a Q-switched type laser with a nominal power of several hundred watts can advantageously be used, which delivers pulses of a duration on the order of 1/50 of a nanosecond with a maximum power of 1-20 megawatts. This type of laser makes it possible, for example, to obtain an impact zone of the rectangular beam of 2 mm (in a direction perpendicular to the median plane 51) and 1 mm, or less than 1 mm (for example 0.5 mm) in the direction of the length of this median plane. The displacement of the beam then makes it possible to create ablation zones 61 and 62 on either side of the plane 51 without the occurrence of a flow along the faces 71 and 72.

The morphology of the ablation zones 61 and 62 will naturally be adapted to the welding conditions that follow, in particular to the width of the welded zone. It is thus possible, depending on the nature and the power of the welding process that will follow, for the width of each of the ablation zones 61 and 62 to be between 0.25 and 2.5 mm or, for example, in the case of hybrid laser arc or plasma welding, between 0.25 and 3 mm. The ablation conditions will be selected so that the sum of the widths of the ablation zones 61 and 62 is greater than the width of the welded zone.

If the sheets 11 and 12 are identical, it is possible to specify that the widths of the ablation zones 61 and 62 are also identical. But it is also possible to specify, for example using a horizontal shift of the laser beam in the lateral direction with reference to the median plane 51, for the widths of these ablation zones to be different.

According to the invention, the ablation can be carried out only one side of the principal faces. FIG. 2 therefore illustrates this case, where the simultaneous peripheral ablation has been carried out only on the side of the principal faces 111 and 121.

However, to minimize, as far as possible, the introduction of aluminum during welding to be carried out on the sheets, it is also possible to preferably carry out this simultaneous peripheral ablation on all of the faces, i.e. 111, 121, 112, 122. For this purpose, in the case of an ablation by laser welding, a device of the "power switch" type can be advantageously used, which divides the power of the beam, one part being used for the simultaneous ablation of the phases 111 and 121, and the other part for the simultaneous ablation of the faces 112 a 122. It is also possible to use a second laser which is separate from the first.

After this simultaneous ablation operation, there will be two sheets, from the periphery of which the metallic alloy layer has been removed, that are suitable for welding. This welding can be done later and the sheets can be either kept facing each other or separated. They can be separated easily because the method according to the invention makes it possible to limit the flow of liquid aluminum between the sheets so that a solidified flow does not create any undesirable mechanical bond.

But the inventors have also discovered that an in-line welding operation can be advantageously carried out on the sheets prepared in the manner described above. On account of the absence of a flow of aluminum over the secondary face, the prepared sheets can be welded immediately without the need to remove the sheets from the line and then reposition them after cleaning. The interval of time that elapses between the simultaneous ablation operation and the welding operation is less than one minute, which minimizes oxidation on the faces 71 and 72 and achieves higher productivity. In addition, when this interval of time is short, the welding is done on the sheets that have been preheated by the ablation operation so that the quantity of energy to be applied for the welding can be reduced.

It is also possible to use any continuous welding method appropriate to the thicknesses and productivity and quality conditions required for the welded joints, and in particular:
  laser beam welding
  electric arc welding, in particular using the TIG ("Tungsten Inert Gas"), plasma, MIG ("Metal Inert Gas") or MAG ("Metal Active Gas") methods
  electron beam welding.

Figure 5:
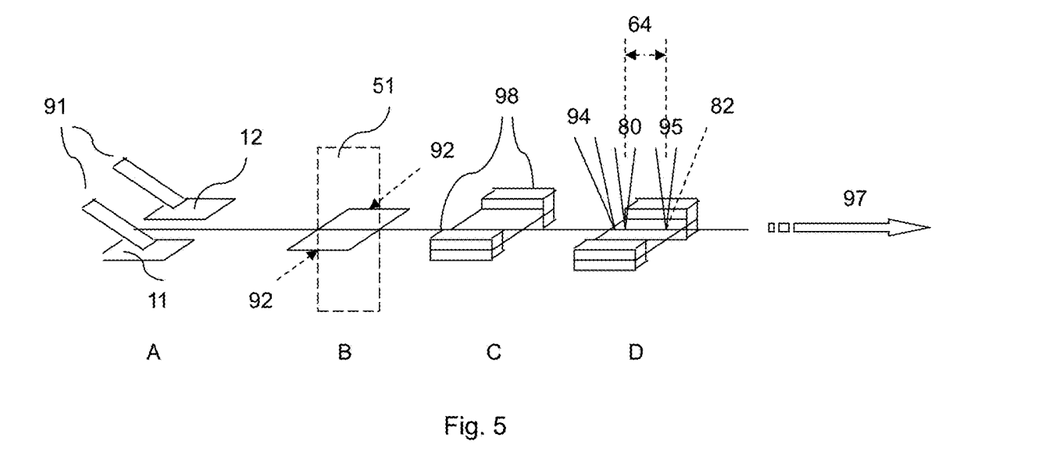
FIG. 5 is a diagram illustrating a preferred device according to the invention.

Laser welding is one method that can be used advantageously on account of the high energy density inherent to this method, which makes it possible to obtain a narrow molten zone which varies within small proportions. This method can be used by itself or in combination with a filler rod 82, as illustrated in FIG. 5. In this case, it is possible to modify the composition of the molten zone thanks to a composition of the filler rod which is different from that of the compositions of the sheets 25 and 26. The welding method that combines a laser beam and a filler rod can then include either a method where the filler rod is melted only by the laser beam or by a hybrid laser-TIG welding method, i.e. a laser beam combined with an electric arc delivered by a TIG welding torch equipped with an non-melting electrode, or a hybrid laser-MIG welding method in which the welding torch is equipped with a melting electrode rod.

According to one variant of the invention, the devices that carry out the simultaneous ablation and welding operations are combined into a single piece of equipment. This equipment is driven at a single rate of relative displacement with reference to the sheets. In this equipment, the rate of simultaneous ablation is identical to the welding speed, which makes it possible to conduct fabrication under optimal conditions of productivity and efficiency.

Figure 4:
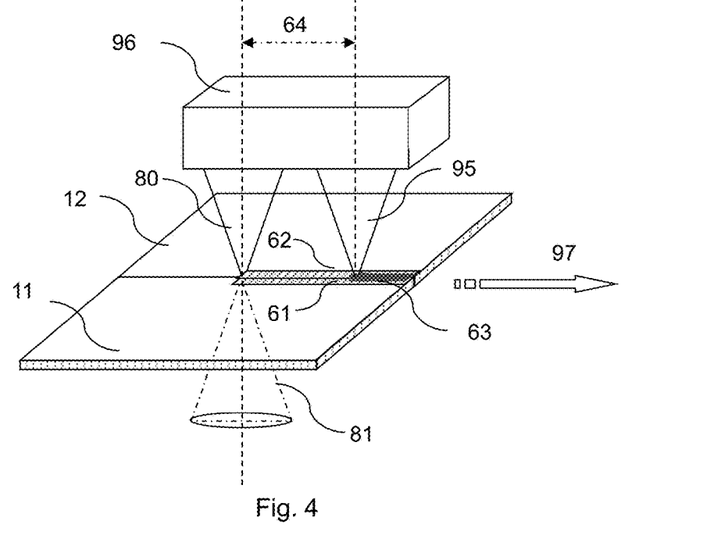
FIG. 4 is a schematic illustration of one preferential embodiment of the invention.

FIG. 4 illustrates one preferential variant of the invention. The figure shows the sheets 11 and 12 having a pre-coating of aluminum, aluminum alloy or aluminum-based alloy. A first laser beam 80 carries out a simultaneous ablation of a peripheral zone 61 of the sheet 11 and a peripheral zone 62 of the sheet 12, whereby the laser beam spans the median plane of the sheets 11 and 12. A second laser beam 81 simultaneously carries out an identical operation on the bottom face of the sheet. In one variant (not illustrated in FIG. 4), only one laser beam 80 carries out the ablation, which is not carried out on the opposite face. This variant will be used when it is not necessary to achieve a very low aluminum content in the welded zone that will subsequently be created.

At a certain distance 64 from this first ablation zone, a laser beam 95 carries out the welding of the sheets 11 and 12 to create a welded zone 63. The distance between the ablation and welding devices is kept constant using a device, which is itself known and is represented schematically as 96. The sheets 11 and 12 are displaced with reference to this assembly 96 along to the path indicated by 97.

The sheets 11 and 12 are advantageously clamped using a clamping device, which is not shown in FIG. 4. The sheets are clamped during the ablation operation by the beams 80 and 81. This clamping is maintained through the welding process, which is itself carried out by the beam 95. In this manner, no relative displacement occurs between the sheets 11 and 12 and the welding by the laser beam 95 can be carried out with greater precision.

The maximum distance between the points of impact of the beams 80, 81 on one hand and 95 on the other hand depends in particular on the welding speed. As described above, the welding speed will be determined in particular so that the time that elapses between the impacts of the beams (80, 81) and 95 is less than one minute. This maximum distance can be preferably less than 2 m so that the equipment is particularly compact.

The minimum distance 64 between these points of impact can be reduced to 0.5 mm. A distance smaller than 0.5 mm would result in an undesirable interaction between the ablation beams 80, 81 on one hand and the "keyhole" which is inherently present during welding by the beam 95 on the other hand.

A short distance 64 can also be obtained by combining the two ablation and welding heads (the heads being defined as the devices from which the laser beams are emitted) into a single more compact head, whereby the latter can use, for example, the same focusing element for the ablation and welding operation.

A very small distance 64 makes it possible to implement the method using a particularly compact unit and to proceed so that a certain quantity of the thermal energy delivered by the laser beams 80 and 81 is added to the linear welding energy delivered by the beam 95, thereby increasing the total energy efficiency of the method. A very small distance makes it possible to shorten the cycle time necessary for the unit production of a welded blank, and thus to increase productivity. These effects are obtained in particular when the distance 64 is less than 600 mm or even less than 5 mm.

FIG. 5 is a schematic diagram of a preferred device according to the invention. This device includes the following elements:

- a station A having a delivery device 91 which is known in itself, which makes it possible to deliver at least one first 11 and one second 12 steel sheet pre-coated with aluminum or aluminum alloy or an aluminum-based alloy.
- a station B having a positioning device 92 for these sheets 11 and 12, which is itself also known. After the positioning of the sheets, a virtual median plane 51 is therefore defined.
- a station C having a clamping device 98 for these sheets 11 and 12, which is itself known, and which can be, for example, a magnetic, mechanical or hydraulic clamping device.
- a station D having at least one guidance device 94 which is itself known, and makes it possible to detect the median plane 51 and to position the laser beam 80 with reference to this median plane. This device can include, for example, an illumination of the zone of the median plane by a light beam, and a photosensitive CCD or CMOS sensor for the reflected beam, which makes it possible to locate the position (x, y) of the median plane at a given instant. This makes it possible to control the positioning of the ablation laser beam 80, which is downstream in the relative welding direction, so that its position coincides with the desired location of the ablation zone.
- at least one source that makes it possible to obtain a laser beam 80 to remove by melting and vaporization the metallic aluminum layer simultaneously on the peripheral zone on either side of the median plane 51. As mentioned above, a second laser beam 81 (not illustrated in FIG. 5) can also carry out the same operation on the opposite faces.
- at least one source that makes it possible to obtain a laser beam 95 welding of the sheets 11 and 12 in the zone from which the metallic aluminum layer 61, 62 is removed, to obtain a welded joint. The laser source used can be selected from among a laser source of the $CO_2$ gas laser type with a wavelength of 10 µm or a solid-state laser source wavelength of 1 µm. Taking into consideration the thickness of the sheets, which is typically less than 3 mm, the power of the $CO_2$ gas laser will be greater than or equal to 3, or even to 7 kW; in the case of a solid-state laser, the power will be greater than or equal to 2, or even 4 kW.

Optionally, a second laser beam, of a type similar to 95, can be applied in the lower portion, i.e. on the opposite face. This arrangement makes it possible to increase the welding speed and/or to reduce the unit power of the source 95.

This beam 95 can be guided either by its own guidance device which is separate from 94 (case not illustrated in FIG. 5) or by the device 94. The inventors have discovered that this latter solution is particularly advantageous because it makes it possible for the weld to be positioned exactly in the zone where the ablation has been carried out, i.e. for the two steps of ablation and welding to be completely coordinated.

Optionally, the assembly can include a filler rod device 82 to modify the composition of the molten zone thanks to a composition of the filler rod that is different from the compositions of the sheets 25 and 26.

The sheets 11 and 12 are moved from the station A toward the station D to obtain a relative displacement of the sheets with reference to the laser beams 80 and 95, the latter being positioned on the same line with reference to the median plane 51, and at a fixed distance 64 from each other.

As noted above, this distance 64 is preferably between 0.5 mm and 2 m, preferably between 0.5 mm and 600 mm, or between 0.5 mm and 5 mm.

Figure 6A:
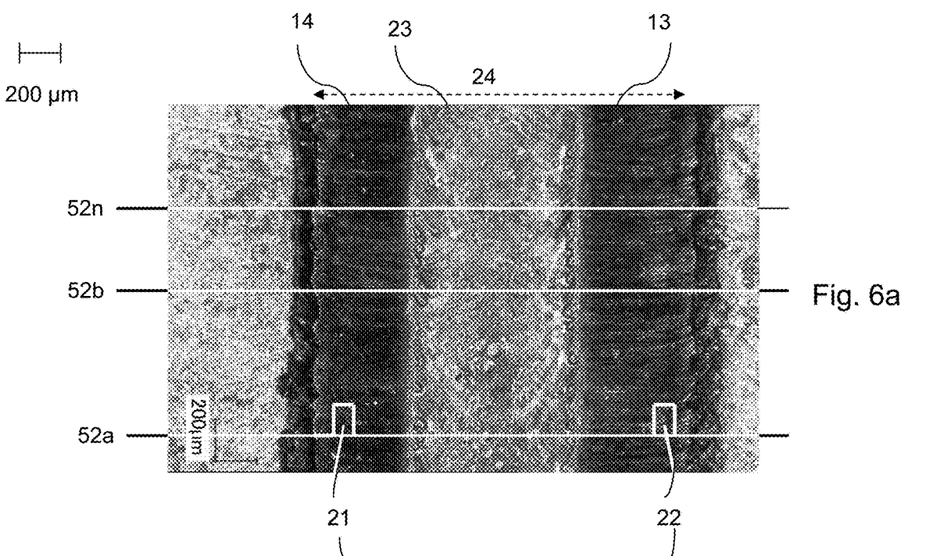
FIG. 6a is a view in elevation of a laser-welded joint constructed according to the invention. The micrographs 6b) and 6c) show in detail the surface of two zones where the ablation has taken place that are located symmetrically one on either side of the welded joint.

The welded blank obtained by the method according to the invention has the following specific characteristics:

as illustrated in FIG. 5, the welding of the blanks takes place in line along the median plane 51 on the blanks 11 and 12 that have undergone a simultaneous ablation by the beam 95. The ablation results in a melting and vaporization of the coating, wherein its subsequent solidification occurs forming specific ripples, the spacing of which is a function of the pulse duration and the advancing speed of the ablation beam. In the method illustrated in FIG. 5, this solidification morphology is identical on both sides of the plane 51, because the ablation is carried out using a beam that spans this joint plane. FIG. 6 also shows a macrographic view in elevation of a welded joint created using the method illustrated in FIG. 5. The zones 13 and 14, which have undergone a simultaneous ablation, are located one on either side of the weld 23. If we consider the zones 21 and 22 located facing each other along a cross section 52a, we find that the solidification morphology is identical. The same is true for the other sections 52b . . . 52n. In addition, when the welding laser beam 95 impacts the two sheets to be assembled, this impact occurs over zones, the reflectivity of which is identical on either side of the plane 51, so that an absolutely identical depth of penetration is obtained on both sides of this plane. The invention therefore makes it possible to obtain a very regular geometry of the final welded joint and a very uniform dilution of the aluminum in the weld, regardless of the cross-section 52a, 52b . . . 52n in question.

on the other hand, in the prior art, it has been seen that the ablation was carried out on only one sheet at a time, using a laser beam in longitudinal displacement that uses the edge of the sheet as a reference point. However, in spite of the precautions taken in the operation of cutting the sheets, the straightness of a prepared edge inevitably includes some variation with reference to an ideal straight line, whereby the variation can be quantified by a standard deviation $\sigma_1$. In addition, the longitudinal displacement of the laser beam is itself subject to a variation of its position in the transverse direction, which can be quantified by a standard deviation $\sigma_2$. This method therefore produces a sheet, the width of the ablation zone of which having a standard deviation variation $(\sigma_1+\sigma_2)$ in the longitudinal direction of the ablation operation. After this operation, these two sheets are placed next to one another and then welded. The result is a welded blank, the total width of the ablation zone of which includes a certain variability, which is the sum of the variabilities associated with each of the two sheets, i.e. $2(\sigma_1+\sigma_2)$.

for purposes of comparison, in the method according to the invention, the ablation is carried out by using a single reference plane, the median plane 51, and the ablation operation is carried out in a single step so that the variability of the total width of the zone with ablation in the longitudinal direction is equal to $(\sigma_1+\sigma_2)$, i.e. a reduction by one-half compared to the prior art. Width measurements of the total ablation zone taken at different positions along a welded joint show that the width varies by less than 10%.

Figure 7A:
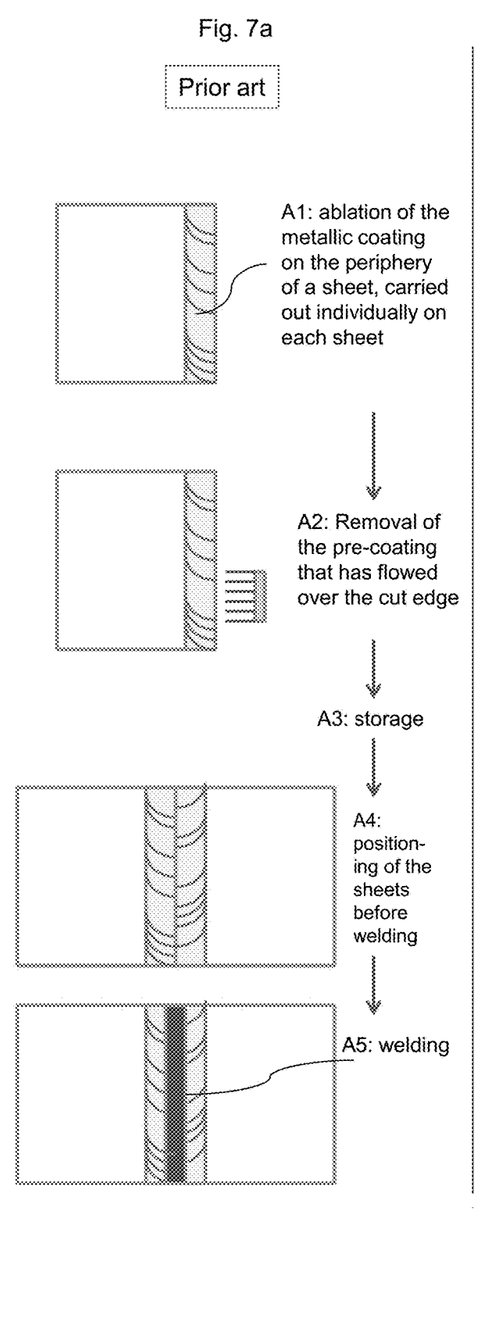
FIG. 7a is a schematic illustration of the steps of the conventional method for the fabrication of welded blanks pre-coated with a metallic coating. For purposes of comparison.
Figure 7B:
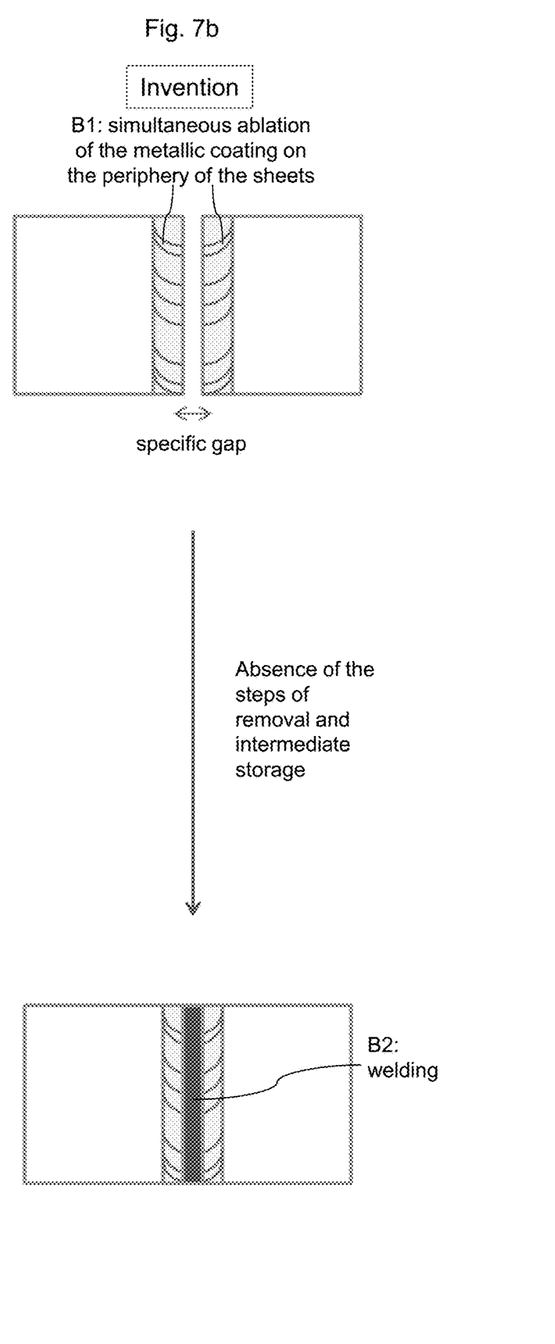
FIG. 7b illustrates the method according to the invention for the fabrication of welded blanks pre-coated with a metallic coating.

In summary, FIGS. 7a and b schematically illustrate the comparison of the steps of the conventional method for the fabrication of welded blanks pre-coated with a metallic coating with the method according to the invention.

In the case of the conventional method (FIG. 7a), the ablation of the metallic pre-coating is carried out on the periphery of each sheet, wherein this operation is conducted individually on each sheet (step A1). Then (step A2), the pre-coating that has run over the cut edge resulting from step A1 is removed. After an intermediate storage of the sheets (step A3), the sheets are positioned for their assembly by welding (Step A4). After this positioning, there is no symmetry between the solidification structures in the peripheral ablation zones, whereby these structures are positioned randomly with reference to the median mating plane of the sheets. The sheets are then welded (step A5).

In the case of the method according to the invention (FIG. 7b), the metallic pre-coating on the periphery of the sheets placed end to end is removed simultaneously, maintaining a specific gap between the sheets (step B1). This operation produces a situation in which the solidification structures are identical and symmetrical on either side of the median positioning plane. Then, without an intermediate step, the sheets thus prepared are immediately assembled (step B2).

It is therefore apparent that the welded joints constructed according to the conventional method and according to the invention differ in terms of the morphological characteristics in the solidification zones in immediate proximity to the molten metal created by welding.

By way of non-limiting examples, the following embodiments illustrate the advantages achieved by the invention.

EXAMPLE

Steel sheets 1.2 mm thick having the following composition by weight: 0.23% C, 1.19% Mn, 0.014% P, 0.001% S, 0.27% Si, 0.028% Al, 0.034% Ti, 0.003% B and 0.18% Cr, with the balance made up of iron and impurities resulting from processing, are procured. These blanks include a pre-coating 30 µm thick on each face. This pre-coating is made up of an intermetallic layer 5 µm thick in contact with the steel substrate containing 50% by weight aluminum, 40% by weight iron and 10% by weight silicon. This intermetallic alloy layer results from the reaction between the steel substrate and the aluminum alloy bath.

The intermetallic layer is topped by a metallic layer 25 µm thick, containing, by weight, 9% silicon, 3% iron and the balance made up of aluminum and unavoidable impurities.

The dimensions of these sheets are 400 mm×800 mm. The welding is to be carried out on the edges 400 mm long.

Two of these sheets are positioned so that the gap between their facing edges is 0.1 mm. The metallic layer on the periphery of these sheets is then removed using a pulsed laser with an average power of 800 W.

This ablation is carried out simultaneously by two beams on each of the opposite faces of the sheet. The sheets are placed in motion with reference to the beam at a constant speed V=6 m/m in. Each of the beams is focused to obtain a rectangular focal spot 2 mm×0.5 mm, the distance of 2 mm extending in the transverse direction with reference to the median plane of the two sheets. In this manner, two sheets are created simultaneously, from the periphery of which the metallic layer is removed over a width of practically 1 mm on each of the sheets. This ablation operation is guided by a sensor that detects the position of the median plane between the two sheets, located immediately upstream with reference to the two pulsed ablation laser beams, in a position identified as $x_0$. The sensor is located at a distance $d_1$ approximately 100 mm from the ablation beams. At the level of the sensor, the coordinates ($x_0$, $y_0$) of the position of the median plane are recorded at an instant $t_0$ by computerized means. As the sheets move at a speed v, this plane position reaches the level of the pulsed ablation beams at an instant $$t_1 = t_0 + \frac{d_1}{V}.$$

Thanks to a guidance device of the laser beams, the exact position of the impact of the laser beams on the sheets that occurs at the instant $t_1$ is adapted so that it corresponds exactly to the ablation zone defined on the basis of the position of the median plane.

After ablation, a laser beam located at a fixed distance $d_2$ of 200 mm from the pulsed laser beams makes it possible to create a welded joint between these sheets. The welding is carried out with a linear power of 0.6 kJ/cm, under the protection of helium, to prevent decarburization, oxidation and hydrogen absorption phenomena. The length of time that elapses between the ablation operation and the welding is 2 seconds.

The welding laser beam is guided here again using the sensor located upstream of the ablation operation. The position of the median plane recorded at the instant $t_0$ arrives at the level of the welding laser beam at the instant $$t_2 = t_0 + \frac{(d_1 + d_2)}{V}.$$

The precise position of the impact of the welding laser beam is then adjusted using the optical guidance device of the laser beam, so that it is centered on the position of the previously defined median plane.

FIG. 6a is a macrograph illustrating a view in elevation of the laser-welded joint obtained, in which the weld 23 is surrounded by two zones 13 and 14 where the ablation has been carried out simultaneously. The total ablation width 24 is an average of 1.92 mm and varies by less than 10% over the length of the welded blank.

Figure 6B:
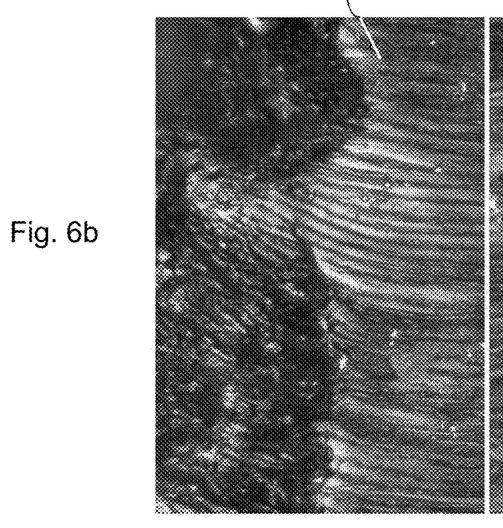
Figure 6C:
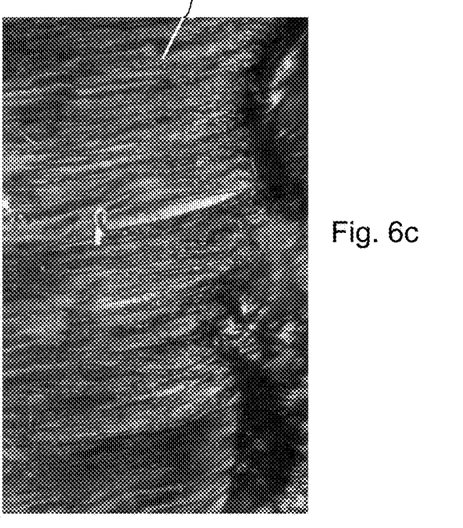

FIGS. 6b and 6c are enlarged views of the surface of zones 21 and 22, which are located symmetrically on either side of the section 52a transverse to the welded joint. It has been found that the solidification wrinkles of these zones 21 and 22 are identical on either side of the welded joint and have a continuous character.

In addition, a Castaing microprobe was used to analyze the aluminum content of the welded zone thus created. The aluminum content remains below 0.3%, which clearly indicates that the quantity of aluminum on the secondary faces, after the ablation step and before welding, is practically zero.

A welded blank assembled under the conditions of the invention was then heated in a furnace to a temperature of 900° C. and held at this temperature, whereby the total hold time in the furnace was 6 minutes. The heated blank was then hot stamped to form a part, which was held in the stamping press tool to cool the part at a rate greater than the critical martensitic tempering rate of the steel.

It was then found that the welded zone on the hot stamped piece did not contain any brittle Fe—Al intermetallic compounds, and that the hardness of the melted zone was practically identical to that of the base metal.

The invention therefore makes it possible to economically produce structural and safety parts for the automobile industry from aluminized sheets having a welded joint.

What is claimed is:

1. A method for the preparation of sheets to be used for the fabrication of a welded steel blank, comprising the steps of:
   procuring at least one pre-coated first steel sheet and one pre-coated second steel sheet, each sheet including:
      a steel substrate and
      a pre-coating including an intermetallic alloy layer in contact with the steel substrate, topped by a metal alloy layer of aluminum metal or aluminum alloy or aluminum-based alloy,
   the first sheet comprising a principal face, an opposite principal face and at least one secondary face,
   the second sheet comprising a principal face, an opposite principal face and at least one secondary face,
   positioning the first and second sheets to form a gap from 0.02 and 2 mm between the secondary faces, the secondary faces facing each other, the positioning of the first and second sheets defining a median plane perpendicular to the principal faces of the first and second sheets; and
   removing the metal alloy layers in first and second peripheral zones of the first and second sheets, respectively, by melting and vaporization simultaneously on the principal faces of the sheets, the peripheral zones being zones of the principal faces closest to the median plane and located one on either side of the median plane.

2. The preparation method as recited in claim 1, wherein the simultaneous removal by melting and evaporation is carried out by a laser beam that spans the median plane.

3. The preparation method as recited in claim 1, wherein widths of the first and second peripheral zones are from 0.25 to 2.5 mm.

4. The preparation method as recited in claim 1, wherein widths of the first and second peripheral zones are equal.

5. The preparation method as recited in claim 1, wherein widths of the first and second peripheral zones are different.

6. The preparation method as recited in claim 1, wherein the step of removal by melting and vaporization is carried out on the principal faces and on the opposite principal faces simultaneously.

7. The preparation method as recited in claim 1, wherein the intermetallic alloy layers remain in the first and second peripheral zones after the respective metal alloy layers are removed.

8. The preparation method as recited in claim 1, wherein the steel substrates of the first and second steel sheets have different compositions of steel.

9. The preparation method as recited in claim 1, wherein the pre-coatings on the first and second steel sheets have different thicknesses.

10. The preparation method as recited in claim 1, wherein the metal alloy layers include, with the percentages expressed by weight, from 8 to 11% silicon, from 2 to 4% iron, and the a balance of the composition including aluminum and unavoidable impurities.

11. The preparation method as recited in claim 1, wherein the gap is greater than 0.04 mm.

12. The preparation method as recited in any of the claim 1, wherein the gap is greater than 0.06 m.

13. A method for fabricating a welded blank comprising the steps of:

procuring at least first and second sheets prepared by the method recited in claim 1; and carrying out a welding operation of the first sheet and the second sheet in the peripheral zones, along a plane defined by the median plane, less than one minute after the removal of the metal alloy layer by melting and vaporization on the at least one first sheet and at least one second sheet.

14. The fabrication method as recited in claim 13, wherein the welding operation is carried out by at least one laser beam.

15. The fabrication method as recited in claim 13, wherein the welding operation is carried out simultaneously by two laser beams, one effecting a welding of the side of the principal faces, and the other effecting a welding of the side of the opposite principal faces.

16. The fabrication method as recited claim 13 wherein the removing by melting and vaporization is carried out by a laser beam, and the devices for the removal and the welding operation are combined in a single piece of equipment, a relative speed of displacement in relation to that of the at least one first sheet and that of at least one second sheet is identical.

17. The fabrication method as recited in claim 13, wherein the welding operation is carried out using simultaneously at least one laser beam and one filler rod.

18. The fabrication method as recited in claim 13, wherein the removing step is guided by a device that tracks the median plan and wherein coordinates (x-y) defining a location of the plane at an instant t are recorded by a controller and used to guide the welding operation that is subsequently carried out.

19. The fabrication method as recited in claim 13, wherein the removing step is guided by a first device that tracks the median plane and the welding operation is guided by a second device that tracks the median plane and is separate from the first device.

20. The fabrication method as recited in claim 13, wherein the first and second sheets are clamped by a clamping device during the removing step, the clamping being kept constant until the welding operation and at least during the welding operation.

21. A method for fabricating a press-hardened part from a welded blank, comprising the following steps:
procuring at least one welded blank fabricated as recited in claim 13;

heating the at least one welded blank to create, by alloying between the steel substrate and the pre-coating an intermetallic alloy compound, and to confer a partially or totally austenitic structure on the substrate;

hot-forming the at least one welded blank to obtain a part;

cooling the part at a rate sufficient to form at least martensite or bainite in the substrate, thus obtaining a press hardening.

22. The fabrication method as recited in claim 21, wherein the hot forming of the at least one welded blank is carried out by a hot stamping operation.

23. A welded blank fabricated by an assembly comprising:
at least one first and second pre-coated steel sheet prepared by the method recited in claim 1;

at least one welded joint defining the median plane perpendicular to the principal faces of the at least one first and second sheets; and cross sections perpendicular to the median plane wherein the first sheet has at least one first cross section on one side of the median plane and the second sheet has at least one second cross section on the other side of the median plane;

morphological characteristics of the intermetallic alloy layers of the at least one first and second sheets resulting from solidification after melting and vaporization of the pre-coating in the peripheral zones being identical in the at least one first cross section and at least one second cross section.

24. The welded blank as recited in claim 23, wherein a sum of the widths of the peripheral zones varies by less than 10% along the welded joint.

25. The welded blank as recited in claim 23, wherein the metal alloy layer includes, with concentrations expressed by weight, from 8 to 11% silicon and from 2 to 4% iron, the balance of the composition comprising aluminum and unavoidable impurities.

26. Use of a steel part fabricated as recited in claim 21 for the fabrication of structural, anti-intrusion or impact absorption parts in vehicles, in particular automobiles.

27. The preparation method as recited in claim 1, wherein the step of procuring is followed by the step of positioning which is followed by the step of removing.

28. The preparation method as recited in claim 1, wherein the intermetallic alloy layer remains in the peripheral areas after the removal of the metal alloy layer.

* * * * *